(12) United States Patent
Bassampour et al.

(10) Patent No.: US 11,629,255 B2
(45) Date of Patent: Apr. 18, 2023

(54) EMBEDDED SILICONE HYDROGEL CONTACT LENSES

(71) Applicant: Alcon Inc., Fribourg (CH)

(72) Inventors: Zahra Bassampour, Alpharetta, GA (US); Jing Cheng, Suwanee, GA (US); Steve Yun Zhang, Sugar Hill, GA (US)

(73) Assignee: Alcon Inc., Fribourg (CH)

( * ) Notice: Subject to any disclaimer, the term of this patent is extended or adjusted under 35 U.S.C. 154(b) by 210 days.

(21) Appl. No.: 17/205,212

(22) Filed: Mar. 18, 2021

(65) Prior Publication Data

US 2021/0292558 A1 Sep. 23, 2021

Related U.S. Application Data

(60) Provisional application No. 62/991,740, filed on Mar. 19, 2020.

(51) Int. Cl.
| | | |
|---|---|---|
| *C08L 83/06* | (2006.01) | |
| *C08F 220/12* | (2006.01) | |
| *C08G 77/442* | (2006.01) | |
| *G02B 1/04* | (2006.01) | |

(52) U.S. Cl.
CPC ............ *C08L 83/06* (2013.01); *C08F 220/12* (2013.01); *C08G 77/442* (2013.01); *G02B 1/043* (2013.01); *C08G 2210/00* (2013.01)

(58) Field of Classification Search
None
See application file for complete search history.

(56) References Cited

U.S. PATENT DOCUMENTS

| | | |
|---|---|---|
| 4,136,250 A | 1/1979 | Mueller et al. |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,268,132 A | 5/1981 | Neefe |
| 4,276,402 A | 6/1981 | Chromecek et al. |
| 4,327,203 A | 4/1982 | Deichert |
| 4,341,889 A | 7/1982 | Deichert |
| 4,343,927 A | 8/1982 | Chang |
| 4,355,147 A | 10/1982 | Deichert et al. |
| 4,401,371 A | 8/1983 | Neefe |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,929,693 A | 5/1990 | Akashi |
| 4,954,586 A | 9/1990 | Toyohima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono et al. |
| 5,070,170 A | 12/1991 | Robertson et al. |
| 5,070,215 A | 12/1991 | Bambury |
| 5,079,319 A | 1/1992 | Mueller |
| 5,098,546 A | 3/1992 | Kawashima et al. |
| 5,156,726 A | 10/1992 | Nakada et al. |
| 5,166,345 A | 11/1992 | Akashi |
| 5,346,946 A | 9/1994 | Yokoyama et al. |
| 5,358,995 A | 10/1994 | Lai |
| 5,387,632 A | 2/1995 | Lai |
| 5,416,132 A | 5/1995 | Yokoyama et al. |
| 5,449,729 A | 9/1995 | Lai |
| 5,451,617 A | 9/1995 | Lai |
| 5,486,579 A | 1/1996 | Lai |
| 5,760,100 A | 6/1998 | Nicolson et al. |
| 5,843,346 A | 12/1998 | Morrill |
| 5,894,002 A | 4/1999 | Boneberger et al. |
| 5,962,548 A | 10/1999 | Vanderlaan et al. |
| 5,981,675 A | 11/1999 | Valint et al. |
| 6,017,121 A | 1/2000 | Chateau |
| 6,019,914 A | 2/2000 | Lokshin |
| 6,039,913 A | 3/2000 | Hirt et al. |
| 6,113,814 A | 9/2000 | Gemert |
| 6,149,841 A | 11/2000 | Kumar |
| 6,166,236 A | 12/2000 | Bambury |

(Continued)

FOREIGN PATENT DOCUMENTS

| | | |
|---|---|---|
| CN | 103764724 A | 4/2014 |
| EP | 0632329 A1 | 1/1995 |

OTHER PUBLICATIONS

K. J. Sax, et al. "Preparation and Infrared Absorption Spectra of Some Phenyl Ethers", published in J. Org. Chem., 1960, vol. 25 (9), pp. 1590-1595.

*Primary Examiner* — Peter A Salamon
(74) *Attorney, Agent, or Firm* — Jian Zhou

(57) ABSTRACT

The invention is generally related to an embedded silicone hydrogel contact lens comprising a silicone hydrogel material and a hydrophobic insert. The silicone hydrogel material comprises repeating units of at least one first polysiloxane vinylic crosslinker comprising hydrophilized siloxane units each having one methyl substituent and one organic radical including at least one H-bond donor (e.g., hydroxyl groups), wherein the content of said at least one H-bond donor is at least 0.8 meq/g relative to the molecular weight of said at least one first polysiloxane vinylic crosslinker. The hydrophobic insert is composed of a crosslinked polymeric material comprising at least 40% by mole of acrylic repeating units and at least 6% by mole of repeating units of at least one vinylic crosslinking agent. The embedded silicone hydrogel is not susceptible to delamination.

21 Claims, No Drawings

(56) References Cited

U.S. PATENT DOCUMENTS

| | | |
|---|---|---|
| 6,296,785 B1 | 10/2001 | Nelson |
| 6,348,604 B1 | 2/2002 | Nelson |
| 6,762,264 B2 | 7/2004 | Kuenzler et al. |
| 6,851,805 B2 | 2/2005 | Blum et al. |
| 6,867,245 B2 | 3/2005 | Iwata et al. |
| 7,214,809 B2 | 5/2007 | Zanini et al. |
| 7,423,074 B2 | 9/2008 | Lai |
| 7,490,936 B2 | 2/2009 | Blum et al. |
| 7,556,750 B2 | 7/2009 | Xiao |
| 7,584,630 B2 | 9/2009 | Van |
| 7,605,190 B2 | 10/2009 | Moszner et al. |
| 7,883,207 B2 | 2/2011 | Iyer |
| 7,999,989 B2 | 8/2011 | Asai |
| 8,154,804 B2 | 4/2012 | McGinn et al. |
| 8,158,037 B2 | 4/2012 | Chopra |
| 8,215,770 B2 | 7/2012 | Blum |
| 8,348,424 B2 | 1/2013 | Pugh |
| 8,415,405 B2 | 4/2013 | Maggio |
| 8,475,529 B2 | 7/2013 | Clarke |
| 8,480,227 B2 | 7/2013 | Qiu |
| 8,513,325 B2 | 8/2013 | Liu |
| 8,529,057 B2 | 9/2013 | Qiu |
| 8,614,261 B2 | 12/2013 | Iwata et al. |
| 8,658,748 B2 | 2/2014 | Liu et al. |
| 8,697,770 B2 | 4/2014 | Duis |
| 8,741,188 B2 | 6/2014 | Chopra |
| 8,835,525 B2 | 9/2014 | Kuyu |
| 8,874,182 B2 | 10/2014 | Etzkorn et al. |
| 8,993,651 B2 | 3/2015 | Chang |
| 9,052,438 B2 | 6/2015 | Xiao |
| 9,097,840 B2 | 8/2015 | Chang et al. |
| 9,097,916 B2 | 8/2015 | Chopra et al. |
| 9,103,965 B2 | 8/2015 | Chang |
| 9,176,332 B1 | 11/2015 | Etzkorn et al. |
| 9,217,813 B2 | 12/2015 | Liu |
| 9,465,234 B2 | 10/2016 | Chopra et al. |
| 9,475,827 B2 | 10/2016 | Chang et al. |
| 9,618,773 B2 | 4/2017 | Clarke |
| 9,904,074 B2 | 2/2018 | Duis et al. |
| 10,064,977 B2 | 9/2018 | Jiang et al. |
| 10,081,697 B2 | 9/2018 | Huang et al. |
| 10,197,707 B2 | 2/2019 | Xiao et al. |
| 10,203,521 B2 | 2/2019 | Pugh et al. |
| 10,209,534 B2 | 2/2019 | Alli et al. |
| 10,301,451 B2 | 5/2019 | Jing et al. |
| 10,465,047 B2 | 11/2019 | Jing et al. |
| 2004/0141150 A1 | 7/2004 | Roffman et al. |
| 2004/0212779 A1 | 10/2004 | Dahi et al. |
| 2008/0208335 A1 | 8/2008 | Blum et al. |
| 2009/0091818 A1 | 4/2009 | Haddock et al. |
| 2009/0244477 A1 | 10/2009 | Pugh |
| 2010/0072643 A1 | 3/2010 | Pugh |
| 2010/0076553 A1 | 3/2010 | Pugh |
| 2010/0079724 A1* | 4/2010 | Pugh ................ G02C 7/085 351/159.75 |
| 2011/0157544 A1 | 6/2011 | Pugh |
| 2012/0120365 A1 | 5/2012 | Legerton |
| 2012/0140167 A1 | 6/2012 | Blum |
| 2012/0234453 A1 | 9/2012 | Pugh |
| 2014/0276481 A1 | 9/2014 | Pugh et al. |
| 2015/0145155 A1 | 5/2015 | Pugh et al. |
| 2016/0062141 A1 | 3/2016 | De Sio et al. |
| 2017/0166673 A1 | 6/2017 | Huang et al. |
| 2017/0307778 A1* | 10/2017 | Tran ............. B29D 11/00134 |
| 2017/0307779 A1* | 10/2017 | Marullo .......... B29D 11/00048 |
| 2018/0169905 A1* | 6/2018 | Marullo .......... B29D 11/00134 |

* cited by examiner

EMBEDDED SILICONE HYDROGEL CONTACT LENSES

This application claims the benefit under 35 USC § 119 (e) of U.S. provisional application No. 62/991,740 filed 19 Mar. 2020, herein incorporated by reference in its entirety.

The present invention generally relates to an embedded silicone hydrogel contact lens that comprises a hydrophobic rigid insert and is not susceptible to delamination. In addition, the present invention provides a method for producing an embedded silicone hydrogel contact lens of the invention.

BACKGROUND

In recent years, it has been proposed that various inserts can be incorporated in hydrogel contact lenses for various purposes, e.g., for corneal health, vision correction, diagnosis, etc. See, for example, U.S. Pat. Nos. 4,268,132, 4,401,371, 5,098,546, 5,156,726, 6,851,805, 7,490,936, 7,883,207, 8,154,804, 8,215,770, 8,348,424, 8,874,182, 9,176,332, 9,618,773, 10,203,521, and 10,209,534; and U.S. Pat. Appl. Pub. Nos. 20040141150, 20040212779, 2008/0208335, 2009/0091818, 20090244477, 2010/0072643, 2010/0076553, 20110157544, 2012/0120365, 2012/0140167, 2012/0234453, 2014/0276481, and 2015/0145155).

Inserts are typically made of a non-hydrogel material that cannot absorb water and is a non-water-swellable material. One special type of inserts are rigid inserts made of a rigid material (i.e., a highly-crosslinked polymeric material) as rigid center optics for masking astigmatism like a rigid gas permeable (RGP) contact lens. For such inserts, it is expected that there are huge difference in mechanical properties and especially in water-swelling degree between insert material and silicone hydrogel lens material embedding the insert. Due to such huge differences, embedded silicone hydrogel contact lenses are susceptible to lens distortion or especially delamination during the hydration of the hydrogel contact lenses with inserts embedded therein and during the handling and wearing of the embedded silicone hydrogel contact lens. It would be desirable to have embedded silicone hydrogel contact lenses that have rigid hydrophobic inserts therein and not susceptible to delamination.

SUMMARY OF THE INVENTION

In one aspects, the invention provides an embedded silicone hydrogel contact lenses, comprising a silicone hydrogel material and a hydrophobic insert embedded therein, wherein the insert is composed of a crosslinked polymeric material comprising at least about 60% by mole of acrylic repeating units and at least about 6% by mole of repeating units of at least one vinylic crosslinking agent, wherein the silicone hydrogel material comprises repeating units of at least one first polysiloxane vinylic crosslinker comprising hydrophilized siloxane units each having one methyl substituent and one organic radical including at least one H-bond donor, wherein the content of said at least one H-bond donor is at least about 0.8 meq/g relative to the molecular weight of said at least one polysiloxane vinylic crosslinker, wherein the embedded silicone hydrogel is not susceptible to delamination.

The invention, in another aspect, provides a method for producing an embedded silicone hydrogel contact lens of the invention.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or an embedded lens.

A "hydrogel contact lens" refers to a contact lens comprising a hydrogel bulk (core) material. A hydrogel bulk material can be a non-silicone hydrogel material or preferably a silicone hydrogel material. A "silicone hydrogel contact lens" refers to a contact lens comprising a silicone hydrogel bulk (core) material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

A siloxane, which often also described as a silicone, refers to a molecule having at least one moiety of —Si—O—Si— where each Si atom carries two organic groups as substituents.

As used in this application, the term "non-silicone hydrogel" refers to a hydrogel that is theoretically free of silicon.

An "embedded silicone hydrogel contact lens" refers a silicone hydrogel contact lens comprising at least one insert which is made of a non-hydrogel material and embedded within the silicone hydrogel material as the major lens material of the contact lens.

An "insert" refers to any 3-dimensional article which is made of a non-hydrogel material and has a dimension of at least 5 microns but is smaller in dimension sufficient to be embedded in a silicone hydrogel contact lens. In accordance with the invention, a non-hydrogel material can be any material which can absorb less than 5% (preferably about 4% or less, more preferably about 3% or less, even more preferably about 2% or less) by weight of water when being fully hydrated.

In accordance with the invention, an insert of the invention has a thickness less than any thickness of an embedded silicone hydrogel contact lens in the region where the insert is embedded. An insert can be any object have any geometrical shape and can have any desired functions. Examples of preferred inserts include without limitation thin rigid inserts for providing rigid center optics for masking astigmatism like a rigid gas permeable (RGP) contact lens, multifocal lens inserts, photochromic inserts, cosmetic inserts having color patterns printed thereon, etc.

"Hydrophilic," as used herein, describes a material or portion thereof that will more readily associate with water than with lipids.

"Hydrophobic" in reference to an insert material or insert that has an equilibrium water content (i.e., water content in fully hydrated state) of less than 5% (preferably about 4% or less, more preferably about 3% or less, even more preferably about 2% or less).

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (i.e., a temperature of about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C═C< group. Exemplary ethylenically unsaturated groups include without limitation (meth)acryloyl

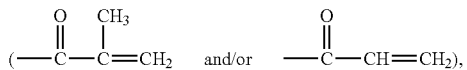

allyl, vinyl, styrenyl, or other C═C containing groups.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

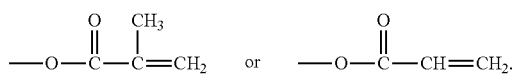

An "(meth)acrylamido monomer" refers to a vinylic monomer having one sole group of

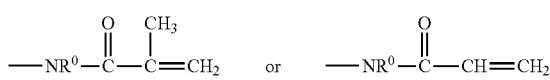

in which $R^\circ$ is H or $C_1$-$C_4$ alkyl.

The term "aryl acrylic monomer" refers to an acrylic monomer having at least one aromatic ring.

An "(meth)acryloxy monomer" or "meth)acryloyloxy monomer" refers to a vinylic monomer having one sole group of

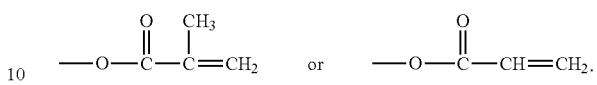

An "(meth)acrylamido monomer" refers to a vinylic monomer having one sole group of

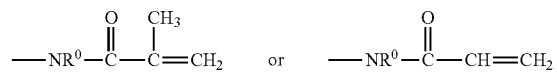

in which $R^\circ$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH═CH$_2$) that is directly attached to the nitrogen atom of the amide group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

A "polysiloxane segment" or "polydiorganosiloxane segment" interchangeably refers to a polymer chain segment (i.e., a divalent radical) of

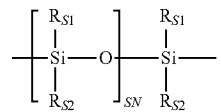

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—OR° (in which alk is $C_1$-$C_6$ alkylene diradical, R° is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}$'), amino linkages of —$NR_{N1}$—, amide linkages of —$CONR_{N1}$—, amide of —$CONR_{N1}R_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl; and a photochromic organic radical having a photochromic group.

A "polysiloxane vinylic monomer" refers to a compound comprising at least one polysiloxane segment and one sole ethylenically-unsaturated group.

A "polydiorganosiloxane vinylic crosslinker" or polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

The intrinsic "oxygen permeability", $Dk_i$, of a material is the rate at which oxygen will pass through a material. Oxygen permeability is conventionally expressed in units of barrers, where "barrer" is defined as $[(cm^3 \text{ oxygen})(mm)/(cm^2)(sec)(mm \text{ Hg})] \times 10^{-10}$. The oxygen permeability can be measured according to the procedures described in Example 1.

The "oxygen transmissibility", Dk/t, of an insert or material is the rate at which oxygen will pass through a specific insert or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$. The oxygen permeability can be measured according to the procedures described in Example 1.

The term "modulus" or "elastic modulus" in reference to a contact lens or a material means the tensile modulus or Young's modulus which is a measure of the stiffness of a contact lens or a material. The modulus can be measured according to the procedures described in Example 1.

An "unprocessed state" refers to an insert which is obtained by cast-molding of a polymerizable composition in a mold and has not been subjected to extraction and/or hydration post-molding processes (i.e., having not been in contact with water or any organic solvent or any liquid after molding).

In general, the invention is directed to an embedded silicone hydrogel contact lens which comprises a soft silicone hydrogel material (having a modulus of less than 1.5 MPa) and a rigid insert composed of a hydrophobic cross-linked polymeric material embedded therein and which is not susceptible to delamination.

The present invention is partly based on the finding that a polymerizable composition (i.e., a silicone hydrogel lens formulation or a SiHy lens formulation) for making silicone hydrogel contact lenses comprises at least one hydrophilized polysiloxane vinylic crosslinker comprising hydrophilized siloxane units each having one methyl substituent and one organic radical including at least one H-bond donor (e.g., hydroxyl groups) in an amount of at least 0.8 meq/g relative to the molecular weight of said at least one hydrophilized polysiloxane vinylic crosslinker can be used in cast molding of embedded silicone hydrogel contact lenses each having a non-hydrogel insert made of a hydrophobic crosslinked polymeric material comprising at least about 40% by mole of acrylic repeating units. The resultant embedded silicone hydrogel contact lenses are not susceptible to delamination during autoclave and storage.

It is believed that when the SiHy lens formulation is in contact with the non-hydrogel insert in a lens mold before curing, a small amount of one or more vinylic monomers (free of bulky groups) could partially penetrate into the surface of the non-hydrogel insert. It is also believed that an adequate amount of the hydrophilized polysiloxane vinylic crosslinker in the SiHy lens formulation could be adsorbed on the surface of the non-hydrogel insert. Such adsorption occurs, likely because the H-bond donors of the organic substituents of the hydrophilized siloxane units of the hydrophilized polysiloxane vinylic crosslinker can penetrate into the non-hydrogel insert sufficiently to form hydrogen bonds with the H-bond acceptors (i.e., ester and/or amide bonds) of the acrylic repeating units of the non-hydrogel insert. It is further believed that free radical initiators comprises H-acceptors and can be brought to the surface of the non-hydrogel insert by the hydrophilized polysiloxane vinylic crosslinker adsorbed on the surface of the non-hydrogel insert. Upon curing of the SiHy lens formulation with the non-hydrogel insert immersed therein in the lens mold to form a silicone hydrogel material, the vinylic monomer(s) on the surface of the non-hydrogel insert and the hydrophilized polysiloxane vinylic crosslinker at the surface of the non-hydrogel insert can be crosslinked/polymerized to form crosslinked polymer chains intercalating with the polymer matrix of the non-hydrogel insert on its surface. With the formation of such intercalating polymer networks of the silicone hydrogel material and the superficial insert material (i.e., on the surface of the non-hydrogel insert), the resultant embedded silicone hydrogel contact lens is not susceptible to delamination (i.e., complete or partial separation of the silicone hydrogel material from the non-hydrogel insert).

The present invention provides, in one aspect, an embedded silicone hydrogel contact lenses, comprising a silicone hydrogel material and a hydrophobic insert embedded therein, wherein the insert is composed of a crosslinked polymeric material comprising at least about 40% (preferably at least about 45%, more preferably at least about 50% even more preferably at least about 55%) by mole of acrylic repeating units and at least about 6% by mole (preferably at least about 8% by mole, more preferably at least about 10% by mole, even more preferably at least about 12% by mole) of repeating units of at least one vinylic crosslinking agent, wherein the silicone hydrogel material comprises (a) repeating units of at least one first polysiloxane vinylic crosslinker comprising hydrophilized siloxane units each having one methyl substituent and one organic radical including at least one H-bond donor (preferably hydroxyl groups) and (b) repeating units of at least one hydrophilic vinylic monomer, wherein the content of said at least one H-bond donor is at least about 0.8 meq/g (preferably at least about 1.0 meq/g, more preferably at least about 1.2 meq/g, even more preferably at least about 1.4 meq/g) relative to the molecular weight of said at least one first polysiloxane vinylic crosslinker, wherein the embedded silicone hydrogel is not susceptible to delamination. Preferably, the insert is rigid.

In accordance with the invention, when no bubble is observed within an embedded silicone hydrogel contact lens under microscopy after autoclave (see Example 1 for detail), the embedded silicone hydrogel contact lens is not susceptible to delamination.

In accordance with the invention, any polysiloxane vinylic crosslinkers can be used in the invention as the first polysiloxane vinylic crosslinkers, so long as they comprises hydrophilized siloxane units each having one methyl substituent and one organic radical having at least one H-bond donor (preferably hydoxyl group). Examples of a class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (G), as described later in this application. They can be prepared according to the procedures disclosed in U.S. patent Ser. No. 10/081,697.

In accordance with the invention, the silicone hydrogel material of the embedded silicone hydrogel contact lens comprises repeating units of at least one hydrophilic vinylic monomer.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

In accordance with the invention, the silicone hydrogel material of the embedded silicone hydrogel contact lens can further comprise repeating units of a silicone-containing vinylic monomer and/or a second polysiloxane vinylic crosslinker (other than the first polysiloxane vinylic crosslinker).

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy)silyl group, polysiloxane vinylic monomers, 3-methacryloxypropylpentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166,236, 6,867,245, 8,415,405, 8,475,529, 8,614,261, and 9,217,813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention as the second polysiloxane vinylic crosslinkers. Examples of preferred polysiloxane vinylic crosslinkers as the second polysiloxane vinylic crosslinker are di-(meth)acryloyl-terminated polydimethyl-siloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers as the second polysiloxane vinylic crosslinker are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (G), are described later in this application and can be prepared according to the procedures disclosed in U.S. patent Ser. No. 10/081,697.

Another class of preferred polysiloxane vinylic crosslinkers as the second polysiloxane vinylic crosslinker are vinylic crosslinkers each of which comprises one sole polydiorganosiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers as the second polysiloxane vinylic crosslinker are chain-extended polysiloxane vinylic crosslinkers each of which has at least two polydiorganosiloxane segments linked by a linker between each pair of polydiorganosiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 10,301,451, and 10,465,047.

In accordance with the invention, the silicone hydrogel material can also comprise repeating units of one or more hydrophobic non-silicone vinylic monomers. Examples of preferred hydrophobic non-silicone vinylic monomers can be non-silicone hydrophobic acrylic monomers (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, etc.), fluorine-containing acrylic monomers (e.g., perfluorohexylethyl-thio-carbonyl-aminoethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isoputyl vinyl ether, cyclohexyl vinyl ether, t-butyl vinyl ether, etc.), styrene, vinyl toluene, vinyl chloride, vinylidene chloride, 1-butene, and combinations thereof.

Any suitable perfluoro-substituted-$C_2$-$C_{12}$ alkyl (meth)acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, and combinations thereof.

In accordance with the invention, the silicone hydrogel material can also comprise repeating units of one or more non-silicone vinylic crosslinkers. Examples of preferred non-silicone vinylic cross-linking agents are described later in this application.

In accordance with the invention, the silicone hydrogel material can also comprises repeating units of other polymerizable materials, such as, a UV-absorbing vinylic monomer, a UV/high-energy-violet-light ("HEVL") absorbing vinylic monomer, polymerizable photochromic compound, a polymerizable tinting agent (polymerizable dye), or combinations thereof, as known to a person skilled in the art.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxy-phenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline) pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929,693, 5,166,345, 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

In a preferred embodiment, the silicone hydrogel material comprises at least about 5% (preferably at least about 10%, more preferably at least about 15%, even more preferably at least about 20%, most preferably at least about 25%) by weight of the first polysiloxane vinylic crosslinker. It is understood that the weight percentages of each of the components of the silicone hydrogel material of the invention can be obtained based on the weight percentages of its corresponding polymerizable component (material) in a polymerizable composition for making the silicone hydrogel material (or contact lens).

In accordance with the invention, the silicone hydrogel material of the embedded silicone hydrogel contact lens has an equilibrium water content (i.e., in fully hydrated state or when being fully hydrated) of from about 20% to about 70% (preferably from about 20% to about 65%, more preferably from about 25% to about 65%, even more preferably from about 30% to about 60%) by weight, an oxygen permeability of at least about 40 barrers (preferably at least about 60 barrers, more preferably at least about 80 barrers, more preferably at least about 100 barrers), and a modulus (i.e., Young's modulus) of about 1.5 MPa or less (preferably from about 0.2 MPa to about 1.2 MPa, more preferably from about 0.3 MPa to about 1.1 MPa, even more preferably from about 0.4 MPa to about 1.0 MPa).

In accordance with the invention, the hydrophobic insert can be made of any crosslinked polymeric material, so long as it has an equilibrium water content of less than 5% by weight and comprises at least 40% by mole of repeating units of one or more acrylic monomers and/or one or more acrylic crosslinker or crosslinking agent and at least about 6% by mole of repeating units of at least one vinylic crosslinking agent. It is understood that acrylic monomers and/or crosslinkers are required for providing H-bond acceptors (ester and/or amide bonds) to the crosslinked polyeric material of the rigid hydrophobic insert of the embedded silicone hydrogel contact lens.

Any hydrophobic acrylic monomers can be used in forming a rigid hydrophobic insert of the inventions. Examples of hydrophobic acrylic monomers includes silicone-containing acrylic monomers (any one of those described above in this application), non-silicone hydrophobic acrylic monomers (any one of those described above in this application), fluorine-containing acrylic monomers (any one of those described above in this application), aryl acrylic monomers as described below, and combinations thereof.

In accordance with a preferred embodiment of the invention, the crosslinked polymeric material of the rigid hydrophobic insert comprises an aryl vinylic monomer of formula (I) or (II)

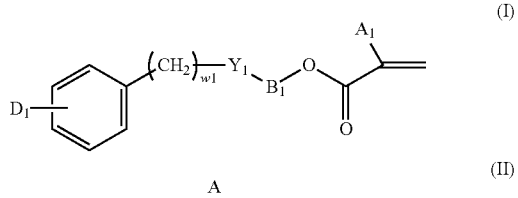

A (II)

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_{n'}H_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

Examples of aryl acrylic monomers of formula (I) include, but are not limited to: 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate; or combinations thereof. The above listed aryl acrylic monomers of formula (I) can be obtained from commercial sources or alternatively prepared according to methods known in the art.

Preferred aryl acrylic monomers of formula (I) are those wherein $B_1$ is $OCH_2CH_2$, $(OCH_2CH_2)_2$, $(OCH_2CH_2)_3$, or $(CH_2)_{m1}$ in which m1 is 2-5, $Y_1$ is a direct bond or O, w1 is 0 or 1, and $D_1$ is H. Most preferred are 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; and their corresponding methacrylates.

Aryl acrylic monomers of formula (II) can be prepared from monofunctional polyphenyl ethers (i.e., ones with one functional group such as hydroxyl, amino, or carboxyl groups). Generally, a monofunctional OH-terminated poly (phenyl ether) is reacted with a (meth)acrylic acid derivative (such as acryloyl chloride, methacryloyl chloride, methacrylic anhydride, or an isocyanatoalkyl acrylate or methacrylate) under coupling reaction conditions known to a person skilled in the art. Mono-amine and mono-carboxylic acid terminated polyphenyl ethers are functionalized in a similar manner using suitable (meth)acrylic acid derivatives. Monofunctional terminated polyphenyl ethers can be prepared according to procedures described in literature (J. Org. Chem., 1960, 25 (9), pp 1590-1595). The experiment procedures for preparing aryl acrylic monomers of formula (II) can be found in U.S. patent Ser. No. 10/064,977.

It is also understood that any hydrophobic vinylic monomer can be used as a substitute for a hydrophobic acrylic monomer, so long as it comprises at least one H-bond acceptor such as ester bond, amide bond, carbonate bond, carbamate bond, ether bond, or combinations thereof. Examples of such hydrophobic monomers include vinyl alkanoates (any one of those described above in this application), vinyloxyalkanes (any one of those described above in this application), and combinations thereof.

It is understood that the mole percentages of each of the components of the crosslinked polymeric material of an insert of the invention can be obtained based on the mole percentages of its corresponding polymerizable component (material) in a polymerizable composition for making the insert.

In accordance with the invention, the crosslinked polymeric material of the rigid hydrophobic insert comprises repeating units of at least one vinylic crosslinking agent. Any suitable vinyl crosslinking agents can be used in the invention. Examples of preferred vinylic cross-linking agents include without limitation: acrylic crosslinking agents (crosslinkers) as described below, allyl methacrylate, allyl acrylate, an aryl crosslinking agent (e.g., divinylbenzene, 2-methyl-1,4-divinylbenzene, bis(4-vinylphenyl) methane, 1,2-bs(4-vinylphenyl)ethane, etc.), or combinations thereof. It is understood that vinylic crosslinking agents are required for imparting the desired rigidity to the crosslinked polymeric material of the rigid hydrophobic insert.

Examples of acrylic crosslinking agents include without limitation ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate; pentaerythritol trimethacrylate; trimethyloylpropane triacrylate; trimethyloylpropane trimethacrylate; tris(2-hydroxyethyl)isocyanurate triacrylate; tris(2-hydroxyethyl)isocyanurate trimethacrylate; 1,3,5-triacryloxylhexahydro-1,3,5-triazine; 1,3,5-trimethacryloxylhexahydro-1,3,5-triazine; pentaerythritol tetraacrylate; pentaerythritol tetramethacrylate; di(trimethyloylpropane) tetraacrylate; di(trimethyloylpropane) tetramethacrylate; allyl methacrylate; allyl acrylate; or combinations thereof.

In a preferred embodiment, the crosslinked polymeric material of the rigid hydrophobic insert comprises repeating units of at least one acrylic crosslinking agent (any one of those described above).

In another preferred embodiment, the crosslinked polymeric material of the rigid hydrophobic insert comprises repeating units of at least one aryl crosslinking agent (any one of those described above).

In another preferred embodiment, the crosslinked polymeric material of the rigid hydrophobic insert comprises repeating units of at least one vinyl-functional polysiloxane that comprises at least two vinyl groups each directly attached to one silicon atom and at least 15% by mole of siloxane units each having at least one phenyl substituent.

Examples of such vinyl functional polysiloxanes include without limitation vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), vinyl terminated diphenylsiloxane-dimethylsiloxane copolymers (e.g., PDV-1625 from Gelest), or combinations thereof. Preferably, the vinyl-functional polysiloxane is vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), or combinations thereof.

A rigid hydrophobic insert can be preferably prepared according to conventional cast-molding methods as well known to a person skilled in the art. A conventional cast molding method typically involves curing a polymerizable composition in a mold, opening the mold, removing the molded insert from the mold, and subjecting the molded insert to post-molding processes (e.g., extraction, surface treatment, etc.).

A polymerizable composition for making rigid hydrophobic inserts can be prepared by mixing all polymerizable materials as described above in the desired proportions, together with one or more polymerization initiators in the presence or preferably in the absence of a non-reactive organic solvent (i.e., a non-reactive diluent) as described later in this application. The polymerizable composition can then be introduced into a mold of desired shape, and the polymerization carried out thermally (i.e., by heating) or photochemically (i.e., by actinic radiation, e.g., UV radiation and/or visible radiation) to activate the polymerization initiators.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

It is understood that the polymerizable composition for making inserts can be cured in two stages: free-radical chain polymerization (i.e., initiated by a thermal initiator having a 10 h half-life temperature of 100° C. or lower at a temperature below 100° C., or alternatively initiated by a photoinitiator) and followed by peroxide-activated curing.

Once the insert materials of the present invention have been cured, they are extracted in a suitable solvent (as described below) to remove as much of the unreacted components of the materials as possible.

Examples of suitable solvents include acetone, methanol, cyclohexane, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2- methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. More preferred organic solvents include without limitation methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, dimethylcyclopentane (various isomers), 2,2,4-trimethylpentane, and mixtures thereof.

The invention also provides a method for producing embedded silicone hydrogel contact lenses, the method of invention comprising the steps of: (1) obtaining a silicone-hydrogel-lens-forming composition (i.e., a silicone hydrogel lens formulation or a polymerizable composition for forming silicone hydrogel contact lenses) which comprises (a) at least one first polysiloxane vinylic crosslinker comprising hydrophilized siloxane units each having one methyl substituent and one organic radical including at least one H-bond donor (preferably hydroxyl groups) and (b) at least one hydrophilic vinylic monomer, wherein the content of said at least one H-bond donor is at least about 0.8 meq/g (preferably at least about 1.0 meq/g, more preferably at least about 1.2 meq/g, even more preferably at least about 1.4 meq/g) relative to the molecular weight of said at least one first polysiloxane vinylic crosslinker; (2) obtaining a rigid hydrophobic insert composed of a crosslinked polymeric material comprising at least about 40% (preferably at least about 45%, more preferably at least about 50% even more preferably at least about 55%) by mole of acrylic repeating units; (3) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed; (4) in no particular order, placing the insert of the invention as described above at a specified position in the lens mold and introducing the silicone-hydrogel-lens-forming composition in the lens mold, wherein the insert is immersed in the silicone-hydrogel-lens-forming composition in the lens mold; (5) curing the silicone-hydrogel-lens-forming composition in the lens mold to form an unprocessed embedded silicone hydrogel contact lens; (6) separating the lens mold obtained in step (5) into the male and female mold halves, with the unprocessed embedded silicone hydrogel contact lens adhered on a lens-adhered mold half which is one of the male and female mold halves; (7) removing the unprocessed embedded silicone hydrogel contact lens from the lens-adhered mold half before the unprocessed embedded silicone hydrogel contact lens is contact with water or any liquid; and (8) subjecting the unprocessed embedded silicone hydrogel contact lens to post-molding processes including a hydration process and one or more other processes selected from the group consisting of extraction, surface treatment, packaging, sterilization, and combinations thereof.

Various embodiments including preferred embodiments of first polysiloxane vinylic crosslinkers and hydrophilic vinylic monomers have been described above in this application and can be used in this aspect of the invention.

A silicone-hydrogel-lens-forming composition can further comprise one or more polymerizable components (materials) selected from the group consisting of at least one silicone-containing vinylic monomer (any one of those described above in this application), at least one second polysiloxane vinylic crosslinker (any one of those described above in this application), at least one hydrophobic non-silicone vinylic monomer (any one of those described above in this application), at least one non-silicone vinylic crosslinker (any one of those described above in this application), a UV-absorbing vinylic monomer (any one of those described above in this application), a UV/HEVL absorbing vinylic monomer (any one of those described above in this application), polymerizable photochromic compound (any one of those described above in this application), a polymerizable tinting agent (polymerizable dye), and combinations thereof.

A silicone-hydrogel-lens-forming composition can also comprise other necessary components known to a person skilled in the art, such as, for example, free-radical initiators (e.g., thermal polymerization initiators, photoinitiators) (as described above in this application), antimicrobial agents (e.g., preferably silver nanoparticles), a bioactive agent, leachable polymeric wetting agents (e.g., non-polymerizable hydrophilic polymers, etc.), leachable tear-stabilizing agents (e.g., phospholipids, monoglycerides, diglycerides, triglycerides, glycolipids, glyceroglycolipids, sphingolipids, sphingo-glycolipids, etc.), and mixtures thereof, as known to a person skilled in the art.

A silicone-hydrogel-lens-forming composition (SiHy lens formulation) can be a solventless clear liquid prepared by mixing all polymerizable components (or materials) and other necessary component (or materials) or a solution prepared by dissolving all of the desirable components (or materials) in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction (any of those solvents as described above in this application).

A solventless lens SiHy lens formulation (silicone-hydrogel-lens-forming composition) typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Numerous SiHy lens formulations (silicone-hydrogel-lens-forming composition) have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

A silicone-hydrogel-lens-forming composition composition (SiHy lens formulation) can be prepared by dissolving/blending all of the desirable components (materials) and optionally one or more organic solvents (described above), according to any known techniques.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the polymerizable composition.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the insert can be placed in the mold and the silicone-hydrogel-lens-forming composition can be introduced (dispensed) into a cavity formed by a mold according to any known techniques known to a person skilled in the art. In a preferred embodiment, an insert is placed on the molding surface of a female mold half at a specified position; and then a specific amount of a silicone-hydrogel-lens-forming composition is dispensed into the female mold half with the insert thereon by means of a dispensing device and then a male mold half is put on and the mold is closed. As the mold closes, any excess unpolymerized lens-forming material is pressed into an overflow provided on the female mold half (or alternatively on the male mold half), and the insert is immersed in the silicone-hydrogel-lens-forming composition in the mold.

After the insert of the invention is placed in the mold and the silicone-hydrogel-lens-forming composition is dispensed into the mold, the closed mold containing the silicone-hydrogel-lens-forming composition subsequently is cured (i.e., polymerized) thermally or actinically (but preferably is initiated thermally) to form an unprocessed embedded silicone hydrogel contact lens.

The actinic polymerization of the silicone-hydrogel-lens-forming composition in the mold can be carried out by irradiating the closed mold with the silicone-hydrogel-lens-forming composition therein with an UV or visible light, according to any techniques known to a person skilled in the art.

The thermal polymerization of the silicone-hydrogel-lens-forming composition in the mold can be carried out conveniently in an oven at a temperature of from 25 to 120° C. and preferably 40 to 100° C., as well known to a person skilled in the art. The reaction time may vary within wide limits, but is conveniently, for example, from 1 to 24 hours or preferably from 2 to 12 hours. It is advantageous to previously degas the silicone-hydrogel-lens-forming composition and to carry out said copolymerization reaction under an inert atmosphere, e.g., under $N_2$ or Ar atmosphere.

In a preferred embodiment, after the silicone-hydrogel-lens-forming composition in the molds in the oven is cured to form unprocessed embedded silicone hydrogel contact lenses, the temperature of the oven is increased to a post-curing temperature of about 105° C. or higher (preferably at least about 110° C., more preferably at least about 115° C., even more preferably at least about 120° C.), and the flow rate of nitrogen gas through the oven is increased to a second flow rate which is at least about 1.5 folds (preferably at least about 2.0 folds, more preferably at least about 3.0 folds, even more preferably at least about 4.0 folds) of the first flow rate.

The post-curing treatment step is carried out by heating the lens mold with the unprocessed embedded silicone hydrogel contact lens therewithin in the oven at the post-curing temperature under nitrogen gas flow through the oven at the second flow rate for at least about 30 minutes (preferably at least about 60 minutes, more preferably at least about 90 minutes, even more preferably at least about 120 minutes).

After the curing step and optionally the post-curing step, the steps of opening a mold (i.e., separating the male mold half from the female mold half with the unprocessed embedded silicone hydrogel contact lens attached onto one of the male and female mold halves) and delensing (i.e., removing the unprocessed embedded silicone hydrogel contact lens from the lens-adhered mold half) are carried out.

After the unprocessed embedded silicone hydrogel contact lens is delensed, it typically is extracted with an extraction medium as well known to a person skilled in the art. The extraction liquid medium is any solvent capable of dissolving the diluent(s), unpolymerized polymerizable materials, and oligomers in the unprocessed embedded silicone hydrogel contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The extracted embedded silicone hydrogel contact lens can then be hydrated according to any method known to a person skilled in the art.

The hydrated embedded silicone hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

All the various embodiments including preferred embodiments of the polymerizable compositions, the silicone-containing vinylic monomers, the silicone-containing vinylci crosslinkers, the hydrophilic vinylic monomers, the non-silicone vinylic crosslinkers, the hydrophobic vinylic monomers, the UV/HEVL-absorbing vinylic monomers, the blending vinylic monomers, the inserts, the RGP disks, the polymeric non-reactive diluents, the water-swelling degrees of unprocessed embedded silicone hydrogel contact lenses, and the equilibrium water contents of the embedded silicone hydrogel contact lenses can be incorporated in these two aspects of the invention.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. An embedded silicone hydrogel contact lens, comprising:
    a silicone hydrogel material and a hydrophobic insert embedded therein,
    wherein the hydrophobic insert is composed of a cross-linked polymeric material comprising at least about 40% by mole of acrylic repeating units and at least about 6% by mole of repeating units of at least one vinylic crosslinking agent,
    wherein the silicone hydrogel material comprises (a) repeating units of at least one first polysiloxane vinylic crosslinker comprising hydrophilized siloxane units each having one methyl substituent and one organic radical including at least one H-bond donor and (b) repeating units of at least one hydrophilic vinylic monomer, wherein the content of said at least one H-bond donor is at least about 0.8 meq/g relative to the molecular weight of said at least one first polysiloxane vinylic crosslinker, and
    wherein the embedded silicone hydrogel is not susceptible to delamination.
2. The embedded silicone hydrogel contact lens of embodiment 1, wherein said at least one first polysiloxane vinylic crosslinker comprises hydrophilized siloxane units each having one methyl substituent and one organic radical including at least one hydroxyl groups.
3. The embedded silicone hydrogel contact lens of embodiment 1 or 2, wherein the content of said at least one H-bond donor is at least about 1.0 meq/g relative to the molecular weight of said at least one first polysiloxane vinylic crosslinker.
4. The embedded silicone hydrogel contact lens of embodiment 1 or 2, wherein the content of said at least one H-bond donor is at least about 1.2 meq/g relative to the molecular weight of said at least one first polysiloxane vinylic crosslinker.
5. The embedded silicone hydrogel contact lens of embodiment 1 or 2, wherein the content of said at least one H-bond donor is at least about 1.4 meq/g relative to the molecular weight of said at least one first polysiloxane vinylic crosslinker.
6. The embedded silicone hydrogel contact lens of any one of embodiments 1 to 5, wherein said at least one first polysiloxane vinylic crosslinker comprises a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.
7. The embedded silicone hydrogel contact lens of any one of embodiments 1 to 5, wherein said at least one first polysiloxane vinylic crosslinker comprises comprises a vinylic crosslinker of formula (G)

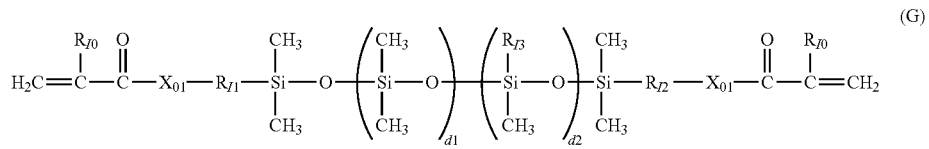

(G)

in which:

d1 is an integer of from 30 to 500 and d2 is an integer of from 1 to 75, provided that d2/d1 is from about 0.035 to about 0.15;

$X_{01}$ is O or $NR_{IN}$ in which $R_{IN}$ is hydrogen or $C_1$-$C_{10}$-alkyl;

$R_{I0}$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (G-1) to (G-5)

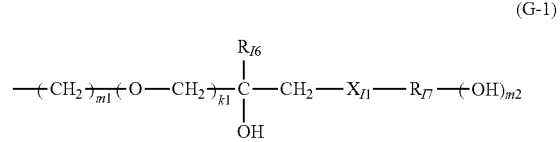

(G-1)

(G-2)

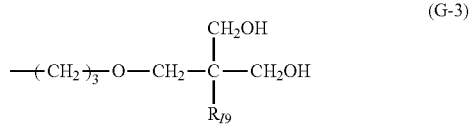

(G-3)

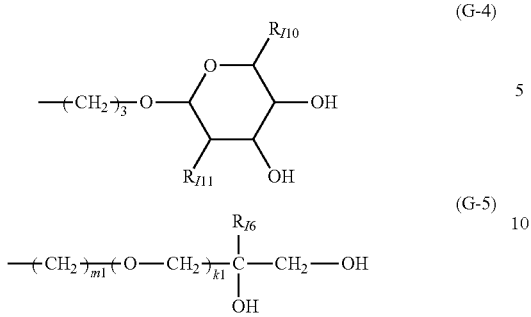

k1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl or 2,3-dihydroxypropyl; and $X_{I2}$ is an amide linkage of

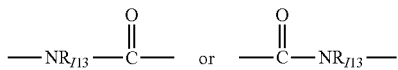

in which $R_{I13}$ is hydrogen or $C_1$-$C_{10}$ alkyl.

8. The embedded silicone hydrogel contact lens of embodiment 7, wherein in formula (G) d2/d1 is from about 0.040 to about 0.12.

9. The embedded silicone hydrogel contact lens of embodiment 7, wherein in formula (G) d2/d1 is from about 0.045 to about 0.10.

10. The embedded silicone hydrogel contact lens of any one of embodiments 7 to 9, wherein in formula (G) $R_{I3}$ is a monovalent radical of formula (G-1).

11. The embedded silicone hydrogel contact lens of any one of embodiments 7 to 9, wherein in formula (G) $R_{I3}$ is a monovalent radical of formula (G-2).

12. The embedded silicone hydrogel contact lens of any one of embodiments 7 to 9, wherein in formula (G) $R_{I3}$ is a monovalent radical of formula (G-3).

13. The embedded silicone hydrogel contact lens of any one of embodiments 7 to 9, wherein in formula (G) $R_{I3}$ is a monovalent radical of formula (G-4).

14. The embedded silicone hydrogel contact lens of any one of embodiments 7 to 9, wherein in formula (G) $R_{I3}$ is a monovalent radical of formula (G-5).

15. The embedded silicone hydrogel contact lens of any one of embodiments 1 to 14, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth) acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth) acrylate, tri(ethylene glycol) (meth)acrylate, tetra(ethylene glycol) (meth)acrylate, poly(ethylene glycol) (meth) acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3, 3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth) acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth) acrylate, trimethylammonium 2-hydroxy propyl (meth) acrylate hydrochloride, dimethylaminoethyl (meth) acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene- 2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio) ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio) ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

16. The embedded silicone hydrogel contact lens of any one of embodiments 1 to 15, wherein said at least one hydrophilic vinylic monomer comprises N-vinylpyrrolidone, N-vinyl-N-methyl acetamide, or combinations thereof.

17. The embedded silicone hydrogel contact lens of any one of embodiments 1 to 16, wherein said at least one hydrophilic vinylic monomer comprises N,N-dimethyl (meth) acrylamide.

18. The embedded silicone hydrogel contact lens of any one of embodiments 1 to 17, wherein said at least one hydrophilic vinylic monomer comprises N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth) acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth) acrylate, tri(ethylene glycol) (meth)acrylate, tetra(ethylene glycol) (meth)acrylate, poly(ethylene glycol) (meth) acrylate having a number average molecular weight of up to 1500, poly(ethylene glycol)ethyl (meth)acrylamide having a number average molecular weight of up to 1500, or combinations thereof.

19. The embedded silicone hydrogel contact lens of any one of embodiments 1 to 18, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

20. The embedded silicone hydrogel contact lens of any one of embodiments 1 to 18, wherein the silicone hydrogel material comprises repeating units of at least one silicone-containing vinylic monomer of formula (M1) or (M2)

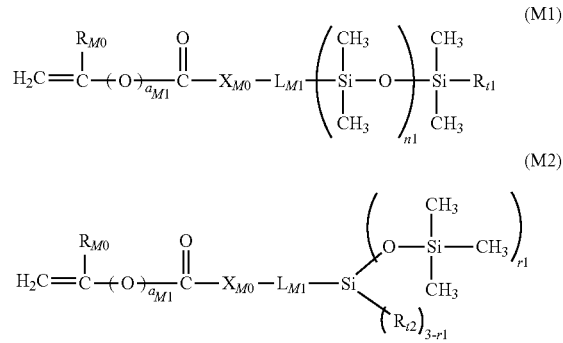

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of -$L_{M1}$'-$X_{M1}$-$L_{M1}$"-, -($C_2H_4O$)$_{v1}$CONH-$L_{M1}$"-, -($C_2H_4O$)$_{v1}L_{M1}$"-, -$L_{M1}$'-NHCOO—($C_2H_4O$)$_{v1}L_{M1}$"-, —$CH_2$—CH(OH).$CH_2$—$X_{M1}$'—($C_2H_4O$)$_{v2}L_{M1}$', -$L_{M1}$'-$X_{M1}$'—$CH_2$—CH(OH).$CH_2$—O-$L_{M1}$"-, or -($C_2H_4O$)$_{v1}CH_2$—CH(OH).$CH_2$—O-$L_{M1}$"; $L_{M1}$' is a $C_2$-$C_8$ alkylene divalent radical which has zero or one hydroxyl group; $L_{M1}$" is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}$' is O or $NR_1$; v1 is an integer of 1 to 30; m2 is an integer of 0 to 30; n1 is an integer of 3 to 40; and r1 is an integer of 2 or 3.

21. The embedded silicone hydrogel contact lens of any one of embodiments 1 to 18, wherein the silicone hydrogel material comprises tris(trimethylsilyloxy)silylpropyl (meth)acrylate, [3-(meth)acryloxy-2-hydroxypropyloxy] propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth) acrylamide, N-(2-hydroxy-3-(3-(bis(trimethylsilyloxy) methylsilyl)propyloxy)-propyl) (meth)acrylamide, N-(2-hydroxy-3-(3-(tris(trimethylsilyloxy)silyl)propyloxy) propyl)-2-methyl acrylamide, N-(2-hydroxy-3-(3-(tris (trimethylsilyloxy)silyl)propyloxy)propyl) (meth) acrylamide, N-[tris(dimethylpropylsiloxy)silylpropyl]-(meth)acrylamide, N-[tris(dimethylphenylsiloxy)-silylpropyl] (meth)acrylamide, N-[tris (dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl) propyloxy)-propyl] (meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)-propyl] (meth)acrylamide, N,N-bis[2-hydroxy-3-(3-(t-butyldimethylsilyl)propyloxy)propyl]-2-methyl (meth) acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris (trimethylsiloxy)silyl]propylvinyl carbamate, 3-[tris (trimethylsiloxy)silyl] propyl allyl carbamate, 3-[tris (trimethylsiloxy)silyl]propyl vinyl carbonate, or a combination thereof.

22. The embedded silicone hydrogel contact lens of any one of embodiments 1 to 21, wherein the silicone hydrogel material comprises α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxypropyloxy-2-hydroxypropyloxypropyl]-terminated ω-$C_1$-$C_4$-alkyl terminated polydimethylsiloxane, α-[3-(meth) acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth) acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-[3-(meth)acryloxy (polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth) acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated w-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth) acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

23. The embedded silicone hydrogel contact lens of any one of embodiments 1 to 22, wherein the silicone hydrogel material comprises repeating units of at least one second polysiloxane vinylic crosslinker.

24. The embedded silicone hydrogel contact lens of embodiment 23, wherein said at least one second polysiloxane vinylic crosslinker comprises a di-(meth)acryloyl-terminated polydimethylsiloxane, a di-vinyl carbonate-terminated polydimethylsiloxane; a di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane, or a combination thereof.

25. The embedded silicone hydrogel contact lens of embodiment 23, wherein said at least one second polysiloxane vinylic crosslinker comprises: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth) acryloyloxy groups, (meth)acryloylamino groups, vinyl carbonate groups, vinylcarbamate groups.

26. The embedded silicone hydrogel contact lens of embodiment 23, wherein said at least one second polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

27. The embedded silicone hydrogel contact lens of any one of embodiments 1 to 26, wherein the silicone hydrogel material comprises repeating units of at least one non-silicone vinylic cross-linking agent.

28. The embedded silicone hydrogel contact lens of embodiment 27, wherein said at least one non-silicone vinylic crosslink agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allylacrylamide, or combinations thereof.

29. The embedded silicone hydrogel contact lens of any one of embodiments 1 to 28, wherein the silicone hydrogel material comprises repeating units of at least one blending vinylic monomer.

30. The embedded silicone hydrogel contact lens of embodiment 29, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoroisopropyl (meth)acrylate, hexafluorobutyl (meth)acrylate, or combinations thereof.

31. The embedded silicone hydrogel contact lens of any one of embodiments 1 to 30, wherein the silicone hydrogel material comprises repeating units of at least one polymerizable material selected from the group consisting of a UV-absorbing vinylic monomer, a UV/HEVL-absorbing vinylic monomer, a photochromic vinylic monomer, a polymerizable dye, and combinations thereof.

32. The embedded silicone hydrogel contact lens of any one of embodiments 1 to 31, wherein the silicone hydrogel material comprises at least about 5% by weight of the first polysiloxane vinylic crosslinker.

33. The embedded silicone hydrogel contact lens of any one of embodiments 1 to 31, wherein the silicone hydrogel material comprises at least about 10% by weight of the first polysiloxane vinylic crosslinker.

34. The embedded silicone hydrogel contact lens of any one of embodiments 1 to 31, wherein the silicone hydrogel material comprises at least about 15% by weight of the first polysiloxane vinylic crosslinker.

35. The embedded silicone hydrogel contact lens of any one of embodiments 1 to 31, wherein the silicone hydrogel material comprises at least about 20% by weight of the first polysiloxane vinylic crosslinker.

36. The embedded silicone hydrogel contact lens of any one of embodiments 1 to 31, wherein the silicone hydrogel material comprises at least about 25% by weight of the first polysiloxane vinylic crosslinker.

37. The embedded silicone hydrogel contact lens of any one of embodiments 1 to 36, wherein the silicone hydrogel material has an equilibrium water content (i.e., in fully hydrated state or when being fully hydrated) of from about 20% to about 70% by weight, an oxygen permeability of at least about 40 barrers, and a modulus (i.e., Young's modulus) of about 1.5 MPa or less.

38. The embedded silicone hydrogel contact lens of any one of embodiments 1 to 36, wherein the silicone hydrogel material has an equilibrium water content (i.e., in fully hydrated state or when being fully hydrated) of from about 20% to about 65% by weigh.

39. The embedded silicone hydrogel contact lens of any one of embodiments 1 to 36, wherein the silicone hydrogel material has an equilibrium water content (i.e., in fully hydrated state or when being fully hydrated) of from about 25% to about 65% by weigh.

40. The embedded silicone hydrogel contact lens of any one of embodiments 1 to 36, wherein the silicone hydrogel material has an equilibrium water content (i.e., in fully hydrated state or when being fully hydrated) of from about 30% to about 60% by weigh.
41. The embedded silicone hydrogel contact lens of any one of embodiments 1 to 40, wherein the silicone hydrogel material has an oxygen permeability of at least about 60 barrers.
42. The embedded silicone hydrogel contact lens of any one of embodiments 1 to 40, wherein the silicone hydrogel material has an oxygen permeability of at least about 80 barrers.
43. The embedded silicone hydrogel contact lens of any one of embodiments 1 to 40, wherein the silicone hydrogel material has an oxygen permeability of at least about 100 barrers.
44. The embedded silicone hydrogel contact lens of any one of embodiments 1 to 43, wherein the silicone hydrogel material has a modulus (i.e., Young's modulus) of from about 0.2 MPa to about 1.2 MPa.
45. The embedded silicone hydrogel contact lens of any one of embodiments 1 to 43, wherein the silicone hydrogel material has a modulus (i.e., Young's modulus) of from about 0.3 MPa to about 1.1 MPa.
46. The embedded silicone hydrogel contact lens of any one of embodiments 1 to 43, wherein the silicone hydrogel material has a modulus (i.e., Young's modulus) of from about 0.4 MPa to about 1.0 MPa.
47. The embedded silicone hydrogel contact lens of any one of embodiments 1 to 46, wherein the crosslinked polymeric material comprises at least about 45% by mole of acrylic repeating units of one or more acrylic monomers and/or one or more acrylic crosslinker or crosslinking agent.
48. The embedded silicone hydrogel contact lens of any one of embodiments 1 to 46, wherein the crosslinked polymeric material comprises at least about 50% by mole of acrylic repeating units of one or more acrylic monomers and/or one or more acrylic crosslinker or crosslinking agent.
49. The embedded silicone hydrogel contact lens of any one of embodiments 1 to 46, wherein the crosslinked polymeric material comprises at least about 55% by mole of acrylic repeating units of one or more acrylic monomers and/or one or more acrylic crosslinker or crosslinking agent.
50. The embedded silicone hydrogel contact lens of any one of embodiments 1 to 49, wherein the crosslinked polymeric material comprises at least about 8% by mole of at least one vinylic crosslinking agent.
51. The embedded silicone hydrogel contact lens of any one of embodiments 1 to 49, wherein the crosslinked polymeric material comprises at least about 10% by mole of at least one vinylic crosslinking agent.
52. The embedded silicone hydrogel contact lens of any one of embodiments 1 to 49, wherein the crosslinked polymeric material comprises at least about 12% by mole of at least one vinylic crosslinking agent.
53. The embedded silicone hydrogel contact lens of any one of embodiments 1 to 52, wherein the said at least one vinylic crosslinking agent comprises at least one acrylic crosslinking agent.
54. The embedded silicone hydrogel contact lens of embodiment 53, wherein said at least one acrylic crosslinking agent is ethylene glycol dimethacrylate; ethylene glycol diacrylate; 1,3-propanediol dimethacrylate; 1,3-propanediol diacrylate; 2,3-propanediol dimethacrylate; 2,3-propanediol diacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate; pentaerythritol trimethacrylate; trimethyloylpropane triacrylate; trimethyloylpropane trimethacrylate; tris(2-hydroxyethyl)isocyanurate triacrylate; tris(2-hydroxyethyl)isocyanurate trimethacrylate; 1,3,5-triacryloxylhexahydro-1,3,5-triazine; 1,3,5-trimethacryloxylhexahydro-1,3,5-triazine; pentaerythritol tetraacrylate; pentaerythritol tetramethacrylate; di(trimethyloylpropane) tetraacrylate; di(trimethyloylpropane) tetramethacrylate; or combinations thereof.
55. The embedded silicone hydrogel contact lens of any one of embodiments 1 to 54, wherein the said at least one vinylic crosslinking agent comprises allyl methacrylate, allyl acrylate, an aryl vinylic crosslinking agent, or combinations thereof.
56. The embedded silicone hydrogel contact lens of embodiment 55, wherein the aryl vinylic crosslinking agent is divinylbenzene, 2-methyl-1,4-divinylbenzene, bis(4-vinylphenyl)methane, 1,2-bs(4-vinylphenyl)ethane, or combinations thereof.
57. The embedded silicone hydrogel contact lens of any one of embodiments 1 to 56, wherein the crosslinked polymeric material comprises repeating units of at least one acrylic monomer which comprises a silicone-containing acrylic monomer, a non-silicone hydrophobic acrylic monomer, a fluorine-containing acrylic monomer, an aryl acrylic monomer, or a combination thereof.
58. The embedded silicone hydrogel contact lens of any one of embodiments 1 to 56, wherein the crosslinked polymeric material comprises repeating units of at least one non-silicone hydrophobic acrylic monomer.
59. The embedded silicone hydrogel contact lens of embodiment 58, wherein said at least one non-silicone hydrophobic acrylic monomer is (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, or combinations thereof.
60. The embedded silicone hydrogel contact lens of any one of embodiments 1 to 59, wherein the crosslinked polymeric material comprises repeating units of at least one fluorine-containing acrylic monomer.
61. The embedded silicone hydrogel contact lens of embodiment 60, wherein said at least one fluorine-containing acrylic monomer is perfluorohexylethyl-thio-carbonyl-aminoethyl-methacrylate, 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, or combinations thereof.
62. The embedded silicone hydrogel contact lens of any one of embodiments 1 to 61, wherein the crosslinked polymeric material comprises repeating units of at least one silicone-containing acrylic monomer.
63. The embedded silicone hydrogel contact lens of any one of embodiments 1 to 62, wherein the crosslinked polymeric material comprises repeating units of at least one polysiloxane vinylic crosslinker.

64. The embedded silicone hydrogel contact lens of embodiment 63, wherein said at least polysiloxane vinylic crosslinker comprises at least 30% by mole of siloxane units each having at least one phenyl substituent.

65. The embedded silicone hydrogel contact lens of embodiment 63, wherein said at least polysiloxane vinylic crosslinker comprises at least 60% by mole of siloxane units each having at least one phenyl substituent.

66. The embedded silicone hydrogel contact lens of embodiment 63, wherein said at least polysiloxane vinylic crosslinker comprises at least 90% by mole of siloxane units each having at least one phenyl substituent.

67. The embedded silicone hydrogel contact lens of embodiment 63, wherein said at least polysiloxane vinylic crosslinker comprises three or more vinylphenylsiloxane units each having at least one phenyl substituent and one vinyl substituent.

68. The embedded silicone hydrogel contact lens of embodiment 63, wherein said at least polysiloxane vinylic crosslinker comprises three or more phenylmethylsiloxane units.

69. The embedded silicone hydrogel contact lens of embodiment 63, wherein said at least polysiloxane vinylic crosslinker comprises three or more diphenylsiloxane units.

70. The embedded silicone hydrogel contact lens of embodiment 63, wherein said at least polysiloxane vinylic crosslinker comprises one or more vinyl terminated polyphenylmethysiloxanes, one or more vinylphenylmethyl terminated phenylmethyl-vinylphenylsiloxane copolymers, one or more vinyl terminated diphenylsiloxane-dimethylsiloxane copolymers, or combinations thereof.

71. The embedded silicone hydrogel contact lens of embodiment 63, wherein said at least polysiloxane vinylic crosslinker comprises one or more vinyl terminated polyphenylmethysiloxanes.

72. The embedded silicone hydrogel contact lens of embodiment 63, wherein said at least polysiloxane vinylic crosslinker comprises one or more vinylphenylmethyl terminated phenylmethyl-vinylphenylsiloxane copolymers.

73. The embedded silicone hydrogel contact lens of any one of embodiments 1 to 72, wherein the crosslinked polymeric material comprises repeating units of at least one aryl acrylic monomer of formula (I) or (II)

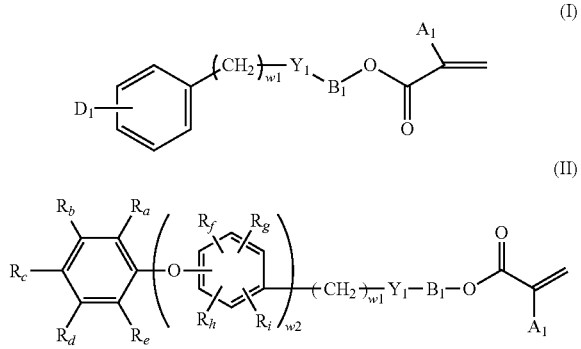

wherein $A_1$ is H or $CH_3$ (preferably H); $B_1$ is $(CH_2)_{m1}$ or $[O(CH_2)_2]_{Z1}$ in which m1 is 2-6 and z1 is 1-10; $Y_1$ is a direct bond, O, S, or NR' in which R' is H, $CH_3$, $C_nH_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

74. The embedded silicone hydrogel contact lens of embodiment 73, wherein said at least one aryl acrylic monomer comprises at least one vinylic monomer selected from the group consisting of 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate, and combinations thereof.

75. The embedded silicone hydrogel contact lens of embodiment 73, wherein said at least one aryl acrylic monomer comprises 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; 2-phenylethyl methacrylate; 3-phenylpropyl methacrylate; 4-phenylbutyl methacrylate; 5-phenylpentyl methacrylate; 2-benzyloxyethyl methacrylate; 3-benzyloxypropyl methacrylate; 2-[2-(benzyloxy)ethoxy]ethyl methacrylate, or combinations thereof.

76. The embedded silicone hydrogel contact lens of any one of embodiments 1 to 75, wherein the crosslinked polymeric material comprises repeating units of at least one hydrohobic vinylic monomer selected from the group consisting of a vinyl alkanoate, a vinyloxyalkane, styrene, vinyl toluene, vinyl chloride, vinylidene chloride, 1-butene, and combinations thereof.

77. The embedded silicone hydrogel contact lens of any one of embodiments 1 to 76, wherein the hydrophobic insert is rigid.

78. A method for producing an embedded silicone hydrogel contact lens of any one of embodiments 1 to 77, comprising the steps of:
    (1) obtaining a silicone-hydrogel-lens-forming composition for forming the silicone hydrogel material recited in any one of embodiments 1 to 77;

(2) obtaining a hydrophobic insert recited in any one of embodiment 1 to 77;
(3) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;
(4) in no particular order, placing the insert at a specified position in the lens mold and introducing the silicone-hydrogel-lens-forming composition in the lens mold, wherein the insert is immersed in the silicone-hydrogel-lens-forming composition in the lens mold;
(5) curing the silicone-hydrogel-lens-forming composition in the lens mold to form an unprocessed embedded silicone hydrogel contact lens that comprises a silicone hydrogel material and the insert embedded within the silicone hydrogel material;
(6) separating the lens mold obtained in step (5) into the male and female mold halves, with the unprocessed embedded silicone hydrogel contact lens adhered on a lens-adhered mold half which is one of the male and female mold halves;
(7) removing the unprocessed embedded silicone hydrogel contact lens from the lens-adhered mold half before the unprocessed embedded silicone hydrogel contact lens is contact with water or any liquid; and
(8) subjecting the unprocessed embedded silicone hydrogel contact lens to post-molding processes including a hydration process and one or more other processes selected from the group consisting of extraction, surface treatment, packaging, sterilization, and combinations thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of an insert and an insert material are determined according to procedures described in ISO 18369-4.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Refractive Index

The refractive index (RI) of inserts is determined by Abbe transmission laboratory refractometer Reichert Abbe Mark III at 25° C. The inserts are fully equilibrated in PBS saline solution before measurement.

Elastic Modulus

The storage modulus (Young's modulus) of inserts is determined using a TA RSA-G2 DMA (Dynamic Mechanical Analyzer). The insert is cut into a 3.08 mm wide strip using Precision Concept dry lens cutter. Five thickness values are measured within 6.5 mm gauge length. The strip is mounted on the instrument with metal grips. Oscillation temperature ramp test with a linear ramping rate at 2° C./minute from 10° C.~ 50° C. is applied on the insert, the material response to increasing temperature is monitored at a constant frequency of 1 Hz, constant amplitude of 0.5% deformation and sampling rate of 10.0 pts/s. Storage modulus (E'), loss modulus (E") and tan δ data are calculated by TRIOS software.

The elastic modulus of a silicone hydrogel material or contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Glass Transition Temperature

Glass transition temperature (Tg) of the insert is defined as the peak of tan δ from the dynamic temperature ramp test as described above.

Delamination

Embedded silicone hydrogel contact lenses are examined for possible delamination either using Optimec instrument or Optical Coherence Tomography (OCT).

Regardless of evaluation method, contact lenses are staged for a minimum of 12 hours at room temperature after autoclave run and prior to delamination study.

After meeting required staging time, fully hydrated contact lens is placed in a "V" graticule assembly of Optimec instrument (Model JCF; OPTIMEC England). After the contact lens is settled under the influence of gravity, the front view of the contact lens is inspected carefully for any sign of circular pattern. Delamination displays as circular patterns in Optimec image.

OCT (Spectral Domain Optical Coherence Tomography; Telesto-II; Thorlabs) could also be utilized to study delamination. OCT allows non-invasive imaging of the contact lens to obtain high resolution cross-section image. For this purpose, after meeting the minimum staging requirement, the contact lens is removed from its blister and is soaked into PBS solution for a minimum of 30 min to come to equilibrium. Then a cuvette with a "V" block feature will be filled approximately ¾ with fresh PBS solution and the contact lens will be transferred to the cuvette using Q-tips. The lens will be allowed to freely float to the "V" shape at the bottom of the cuvette and the entire contact lens will be scanned in increment of 10 degree. Delamination appears as air pocket in interval surface of insert and carrier in OCT images.

Chemicals

The following abbreviations are used in the following examples: PEMA represents phenylethyl methacrylate; PEA represent phenylethyl acrylate; BzA represents benzylacrylate; BzMA represent benzylmathacrylate; PVV represents vinylphenylmethyl terminated phenylmethylsiloxane-vinylphenylsiloxane copolymer (PVV-3522, 800-1500 Daltons, from Gelest); PMV represents vinyl terminated polyphenylmethylsiloxane (PMV-9925, 2000-3000 Daltons from Gelest); TBEC represents tert-Butylperoxy 2-ethylhexyl carbonate; PETA represents pentaerythritol tetraacrylate; TrisMA represents 3-[Tris(trimethylsiloxy)silyl]propyl methacrylate; HFIPMA represents hexafluoroisopropyl methacrylate; NPGDMA represents neopentylglycol dimethacrylate; TrisAm represents N-[tris(trimethylsiloxy)-silyl-propyl]acrylamide; D6 represents monobutyl-terminated monomethacryloxypropyl-terminated polydimethylsiloxane (M.W. 600 to 800 g/mol from Gelest); D9 represents temperature of 88° C.; Nobloc is 2-[3-(2H-Benzotriazol-2-yl)-4-hydroxyphenyl]ethyl methacrylate from Aldrich; RB247 is Reactive Blue 247; TAA represents tert-amyl alcohol; PrOH represents 1-propanol; IPA represents isopropanol; PPG represents poly(propylene glycol); EGBE represents ethylene glycol butyl ether; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; "H4" macromer represents a di-methacryloyloxypropyl-terminated polysiloxane (Mn ~11.3K-12.3K g/mol, OH content ~1.82-2.01 meq/g) of formula (A) shown below; "H1" macromer represents a di-methacryloyloxypropyl-terminated polysiloxane (Mn ~8,000 g/mol, OH content ~1.8-2.0 meq/g) of formula (A) shown below.

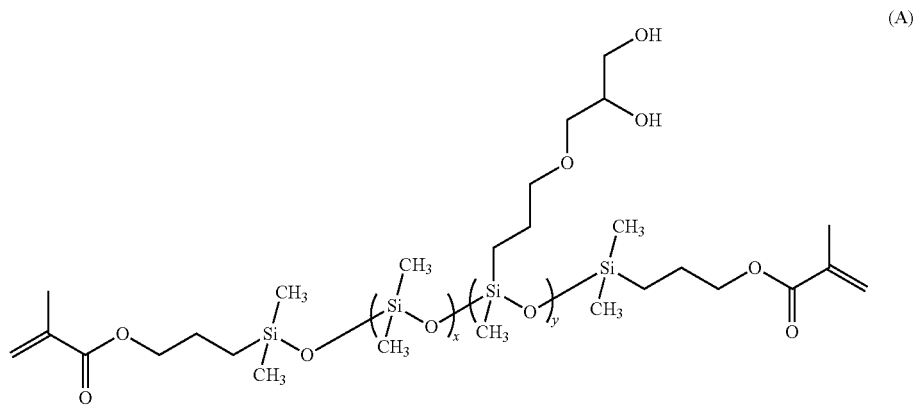

(A)

monobutyl-terminated monomethacryloxypropyl-terminated polydimethylsiloxane (Mw~984 g/mol from Shin-Etsu); Betacon represents a dimethacrylate-terminated chain-extended polydimethylsiloxane (Mn 5000 g/mol), which has two polydimethylsiloxane (PDMS) segments separated by one perfluoropolyether (PFPE) via diurethane linkages between PDMS and PFPE segments and two urethane linkages each located between one terminal methacrylate group and one PDMS segment, is prepared according to method similar to what described in Example B-1 of U.S. Pat. No. 5,760,100; BDDA represents 1,4-butanediol diacrylate; NVP represents N-vinylpyrrolidone; DMA represents N,N-dimethyl acrylamide; MMA represents methyl methacrylate; TEGDMA represent triethyleneglycol dimethacrylate; EGDMA represents ethylene glycol methyl ether methacrylate; AMA represents allyl methacrylate; AIBN represents 2,2'-azobis(isobutyronitrile); Vazo-64 represents 2,2'-dimethyl-2,2'azodipropiononitrile; V88 represents 1,1'-Azobis(cyanocyclohexane) which has a 10-hour half-life Example 2

Preparation of Inserts

Polymerizable compositions (i.e., Insert formulation) for making rigid hydrophobic inserts are prepared at room temperature in air by blending all the components (materials) in their desired amounts (weight parts units) to have the composition shown in Table 1.

TABLE 1

| Insert | Composition (weight part units) | | | | | |
|---|---|---|---|---|---|---|
| Formulation# | HFIPMA | NPGDMA | TrisMA | PETA | RB247 | Vazo-64 |
| 1 | 45 | 18 | 45 | 2 | 1 | 0.5 |
| 2 | 45 | 18 | 45 | — | 0.5 | 0.5 |
| 3 | 45 | 21 | 45 | 3 | 0.5 | 0.5 |
| 4 | 45 | 9 | 45 | — | — | 0.5 |

A polymerizable composition prepared above is purged with nitrogen at room temperature for 30 to 35 minutes. The $N_2$-purged polymerizable composition is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The polymerizable compositions in the molds are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The molds are opened and the molded inserts are removed from the molds.

Optionally, the inserts can be extracted and hydrated as follows. First, the inserts are extracted with PrOH for about 3 hours, rinsed twice with deionized water for about 10 minutes, and then soaked in PBS for at least our hour before testing. It is found that extraction of inserts are not needed.

Preparation of Embedded SiHy Contact Lenses

SiHy lens formulations are prepared at room temperature in air by blending all the components (materials) in their desired amounts (weight parts units) to have the composition shown in Tables 2-4. PPG has a Mn of about 425 Daltons. CE-PDMS has a Mn of about 10.5K Daltons.

TABLE 2

| SiHy Lens Formulation # | Composition (weight part units) | | | | | | | |
|---|---|---|---|---|---|---|---|---|
| | H4 | TrisMA | DMA | MMA | TEGDMA | PPG | EGBE | VAZO-64 |
| 1 | 33 | 17 | 24 | 20 | — | 17 | — | 0.5 |
| 2 | 30 | 14 | 21 | 30 | — | — | 17 | 0.5 |
| 3 | 33 | 17 | 24 | 15 | 1 | — | 25.5 | 0.5 |

TABLE 3

| SiHy Lens Formulation # | Composition (weight part units) | | | | | | |
|---|---|---|---|---|---|---|---|
| | Betacon | TrisMA | DMA | MMA | PPG | EGBE | VAZO-64 |
| 4 | 28 | 22 | 24 | 10 | 20 | — | 0.5 |
| 5 | 33 | 17 | 24 | — | — | 25 | 0.5 |
| 6 | 29 | 17 | 28 | — | — | 25 | 0.5 |

TABLE 4

| SiHy Lens Formulation # | Composition (weight part units) | | | | |
|---|---|---|---|---|---|
| | CE-PDMS | TrisAm | DMA | PrOH | VAZO-64 |
| 7 | 40 | 28 | 32 | 5 | 0.5 |

Cast-molded contact lenses are prepared as follows. An insert prepared above is placed in the central region of the molding surface of a female mold half (made of polypropylene) which preferably has three or more spikes distributed in a circle having a diameter sufficient to accommodate the insert for fixing the position of the insert on the molding surface, an amount of a SiHy lens formulation prepared above is dosed in the female mold half to immerse the insert, a polypropylene male mold half is then placed on top the female mold half, and the mold is closed securely.

The closed mold with an insert immersed in a SiHy lens formulation therein are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The molds are opened and the molded inserts are removed from the molds.

Lens molds each with a molded unprocessed silicone hydrogel contact lens therein are mechanically opened. The molded unprocessed embedded silicone hydrogel contact lens adhere to the male mold halves or female mold halves. Molded unprocessed embedded silicone hydrogel contact lenses adhered to male mold halves are delensed using ultrasonic unit; molded unprocessed embedded silicone hydrogel contact lenses adhered to female mold halves are delensed are manually from lens-adhered female mold halves.

The delensed unprocessed embedded silicone hydrogel contact lenses can be extracted with a mixture of 50:50 of propylene glycol:water. Preferably, the delensed unprocessed embedded silicone hydrogel contact lenses are subjected to the following extraction/hydration, coating, autoclave processes as follows. The unprocessed embedded silicone hydrogel contact lenses are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of a in-package-coating packaging saline which is prepared according to the procedure described in Example 19 of U.S. Pat. No. 8,480,227; and finally autoclaved for about 45 minutes at 121° C. The resultant embedded SiHy contact lenses each have a hydrogel coating thereon and are examined for delamination according to the procedures described in Example 1. The results are reported in Table 5.

TABLE 5

| | Embedded SiHy Contact lenses | | | | | | | |
|---|---|---|---|---|---|---|---|---|
| SiHy Lens Formulation # | 1 | 1 | 2 | 3 | 4 | 5 | 6 | 7 |
| Insert Formulation # | 1 | 2 | 1 | 3 | 2 | 4 | 4 | 4 |
| Delamination | No | No | No | No | Yes | Yes | Yes | Yes |

The results show that embedded SiHy lenses made from a SiHy lens formulation comprising a polysiloxane vinylic crosslinker having hydrophilized siloxane units each having hydroxyl-containing substituent are not susceptible to delamination. In contrast, embedded SiHy lenses made from a SiHy lens formulation comprising a polysiloxane vinylic crosslinker free of any hydrophilized siloxane units each having hydroxyl-containing substituent are susceptible to delamination, even though the polysiloxane vinylic crosslinker comprises 6 H-bond acceptors (urethane bonds) in its main chain.

Example 3

Preparation of Inserts

Polymerizable compositions (i.e., Insert formulations) for making rigid or soft hydrophobic inserts are prepared at room temperature in air by blending all the components (materials) in their desired amounts (weight parts units) to have the composition shown as followings Insert Formulation 5 (rigid): 62 weight part units of PEMA; 27 weight part units of D6; 10 weight part units of BDDA; 1 weight part unit of VAZO-64.

Insert Formulation 6 (semi rigid): 89 weight part units of BzA; 10 weight part units of BDDA; 1 weight part unit of VAZO-64.

Insert Formulation 7 (soft): 29 weight part units of Betacon; 17 weight part units of Tris-MA; 28 weight part units of DMA; 25 weight part units of EGBE; and 0.5 weight part unit of VAZO-64.

Inserts are prepared by cast-molding of an insert formulation prepared above in a mold and then processed, according to procedure described in Example 2.

The properties of inserts are reported in Table 6.

TABLE 6

|  | Insert 5 | Insert 6 | Insert 7 |
| --- | --- | --- | --- |
| Modulus (MPa) | 22 | 8 | 0.9 |
| RI | 1.53 | 1.55 | 1.41 |

Preparation of Embedded SiHy Contact Lenses

SiHy lens formulation #7 prepared in Example 2 is used also in this example. Three additional SiHy lens formulations are prepared at room temperature in air by blending all the components (materials) in their desired amounts (weight parts units) to have the composition shown below:

SiHy Lens Formulation 8: 55 weight part units of H1; 24 weight part units of DMA; 25 weight part units of EGBE; 1 weight part unit of VAZO-64.

SiHy Lens Formulation 9: 57 weight part units of H1; 22 weight part units of DMA; 30 weight part units of EGBE; 1 weight part unit of VAZO-64.

SiHy Lens Formulation 10: 40 weight part units of H1; 15 weight part units of MMA; 20 weight part units of DMA, 28 weight part units of EGBE; 1 weight part unit of VAZO-64.

Embedded SiHy contact lenses are prepared by cast molding and then processed according to procedures as described in Example 2. The resultant embedded SiHy contact lenses each have a hydrogel coating thereon and are examined for delamination according to the procedures described in Example 1. The results are reported in Table 7.

TABLE 7

| | Embedded SiHy Contact lenses | | | | | | | |
| --- | --- | --- | --- | --- | --- | --- | --- | --- |
| SiHy Lens Formulation # | 7 | 7 | 7 | 10 | 10 | 10 | 9 | 8 |
| Insert Formulation # | 5 | 6 | 7 | 5 | 6 | 7 | 5 | 5 |
| Delamination | Yes | Yes | Yes | No | No | No | No | No |

Example 4

Preparation of Inserts

Polymerizable compositions (i.e., Insert formulations) for making hydrophobic inserts are prepared at room temperature in air by blending all the components (materials) in their desired amounts (weight parts units) to have the composition shown in Table 8.

TABLE 8

| Insert | Composition (weight part units) | | | | |
| --- | --- | --- | --- | --- | --- |
| Formulation # | PVV | TEBC | BzA | BDDA | Vazo-64 |
| 8 | 38.7 | 1.3 | 53.4 | 6 | 0.6 |
| 9 | 38.7 | 1.3 | 57.6 | 1.8 | 0.6 |
| 10 | 38.7 | 1.3 | 58.8 | 0.6 | 0.6 |

An insert formulation (polymerizable composition) is purged with nitrogen at room temperature for 30 to 35 minutes. The $N_2$-purged polymerizable composition is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert formulations (polymerizable compositions) in the molds are thermally cured in the oven under the following conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes; ramp from 100° C. to 120° C. at a ramp rate of about 7° C./minute; and holding at 120° C. for about 30 minutes. The molds are opened and the molded inserts are removed from the molds.

The inserts are then extracted and hydrated as follows. First, the inserts are extracted with PrOH for about 3 hours, rinsed twice with deionized water for about 10 minutes, soaked in DI water with 100 ppm Tween 80 for 20 minutes, rinse with deionized water for 5 minutes, and soaked in PBS for at least one hour before testing.

The results of tests are reported in Table 9.

TABLE 9

| Insert # | RI | Modulus (Mpa) | Dk |
| --- | --- | --- | --- |
| 8 | 1.557 | 19.9 | 57 |
| 9 | 1.559 | 19.7 | 55 |
| 10 | 1.560 | 54.0 | 56 |

Preparation of Embedded SiHy Contact Lenses

SiHy lens formulation #7 prepared in Example 2 and SiHy lens formulations #8 and #10 prepared in Example 3 are used also in this example.

Embedded SiHy contact lenses are prepared by cast molding and then processed according to procedures as described in Example 2. The resultant embedded SiHy contact lenses each have a hydrogel coating thereon and are examined for delamination according to the procedures described in Example 1. The results are reported in Table 10.

TABLE 10

| | Embedded SiHy Contact lenses | | | | | | | |
|---|---|---|---|---|---|---|---|---|
| SiHy Lens Formulation # | 7 | 7 | 7 | 10 | 10 | 10 | 8 | 8 |
| Insert Formulation # | 8 | 9 | 10 | 8 | 9 | 10 | 9 | 10 |
| Delamination | Yes | Yes | Yes | No | No | No | No | No |

All the publications, patents, and patent application publications, which have been cited herein above in this application, are hereby incorporated by reference in their entireties.

What is claimed is:

1. An embedded silicone hydrogel contact lens, comprising: a silicone hydrogel material and a hydrophobic insert embedded therein,
    wherein the hydrophobic insert is composed of a crosslinked polymeric material comprising at least about 55% by mole of acrylic repeating units and at least about 6% by mole of repeating units of at least one vinylic crosslinking agent,
    wherein the silicone hydrogel material comprises (a) repeating units of at least one first polysiloxane vinylic crosslinker comprising hydrophilized siloxane units each having one methyl substituent and one organic radical including at least one H-bond donor and (b) repeating units of at least one hydrophilic vinylic monomer, wherein the content of said at least one H-bond donor is at least about 0.8 meq/g relative to the molecular weight of said at least one first polysiloxane vinylic crosslinker, and
    wherein the embedded silicone hydrogel is not susceptible to delamination.

2. The embedded silicone hydrogel contact lens of claim 1, wherein said at least one first polysiloxane vinylic crosslinker comprises hydrophilized siloxane units each having one methyl substituent and one organic radical including at least one hydroxyl groups.

3. The embedded silicone hydrogel contact lens of claim 2, wherein said at least one first polysiloxane vinylic crosslinker comprises a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.

4. The embedded silicone hydrogel contact lens of claim 3, wherein said at least one first polysiloxane vinylic crosslinker comprises comprises a vinylic crosslinker of formula (G)

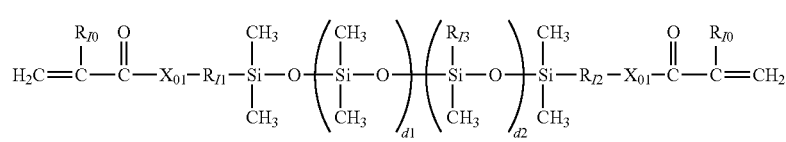

in which:
    d1 is an integer of from 30 to 500 and d2 is an integer of from 1 to 75, provided that d2/d1 is from about 0.035 to about 0.15;
    $X_{01}$ is O or $NR_{IN}$ in which $R_{IN}$ is hydrogen or $C_1$-$C_{10}$-alkyl;
    $R_{I0}$ is hydrogen or methyl;
    $R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;
    $R_{I3}$ is a monovalent radical of any one of formula (G-1) to (G-5)

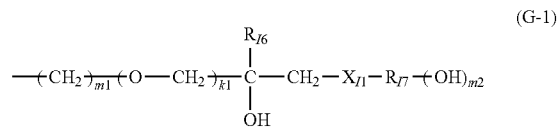

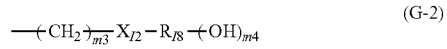

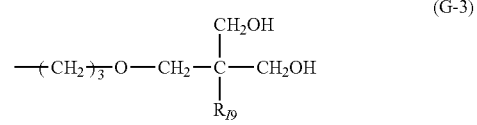

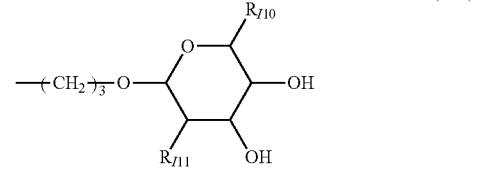

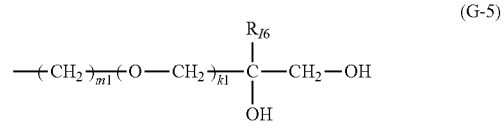

k1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I8}$ is ethyl or hydroxymethyl;

$R_{I10}$ is methyl or hydromethyl;

$R_{I11}$ is hydroxyl or methoxy;

$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and $X_{I2}$ is an amide linkage of

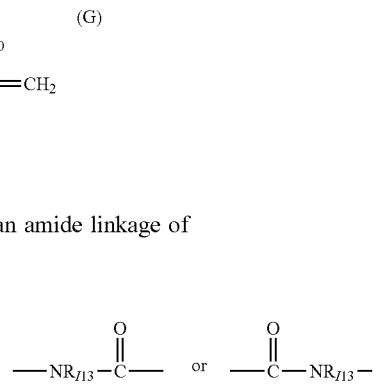

in which $R_{I13}$ is hydrogen or $C_1$-$C_{10}$ alkyl.

5. The embedded silicone hydrogel contact lens of claim 4, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(emth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl methylene-2-pyrrolidone, 5-ethyl-3-methylene-2-pyrrolidone, 1-n-propyl-3-methylene pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly (ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly (ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)-pentyl-2'-(trimethylammonio)ethyl phosphate, 6-((meth)acryloyloxy)hexyl-2'-(trimethyl-ammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)-ethyl-2'-(tributylammonio)ethyl phosphate, 2-((meth)acryloyloxy)propyl-2'-(trimethyl-ammonio)-ethylphosphate, 2-((meth)acryloyloxy)butyl-2'-(trimethylammonio)-ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

6. The embedded silicone hydrogel contact lens of claim 5, wherein the said at least one vinylic crosslinking agent comprises at least one acrylic crosslinking agent.

7. The embedded silicone hydrogel contact lens of claim 6, wherein said at least one acrylic crosslinking agent is ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate; pentaerythritol trimethacrylate; trimethyloylpropane triacrylate; trimethyloylpropane trimethacrylate; tris(2-hydroxyethyl)isocyanurate triacrylate; tris(2-hydroxyethyl)isocyanurate trimethacrylate; 1,3,5-triacryloxylhexahydro-1,3,5-triazine; 1,3,5-trimethacryloxylhexahydro-1,3,5-triazine; pentaerythritol tetraacrylate; pentaerythritol tetramethacrylate; di(trimethyloylpropane) tetraacrylate; di(trimethyloylpropane) tetramethacrylate; or combinations thereof.

8. The embedded silicone hydrogel contact lens of claim 6, wherein the said at least one vinylic crosslinking agent comprises allyl methacrylate, allyl acrylate, an aryl vinylic crosslinking agent, or combinations thereof.

9. The embedded silicone hydrogel contact lens of claim 8, wherein the aryl vinylic crosslinking agent is divinylbenzene, 2-methyl-1,4-divinylbenzene, bis(4-vinylphenyl) methane, 1,2-bs(4-vinylphenyl)ethane, or combinations thereof.

10. The embedded silicone hydrogel contact lens of claim 6, wherein the crosslinked polymeric material comprises repeating units of at least one acrylic monomer which comprises a silicone-containing acrylic monomer, a non-silicone hydrophobic acrylic monomer, a fluorine-containing acrylic monomer, an aryl acrylic monomer, or a combination thereof.

11. The embedded silicone hydrogel contact lens of claim 10, wherein said at least one non-silicone hydrophobic acrylic monomer is (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, or combinations thereof, wherein said at least one fluorine-containing acrylic monomer is perfluorohexylethyl-thio-carbonyl-aminoethyl-methacrylate, 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, or combinations thereof.

12. The embedded silicone hydrogel contact lens of claim 6, wherein the crosslinked polymeric material comprises repeating units of at least one polysiloxane vinylic crosslinker.

13. The embedded silicone hydrogel contact lens of claim 12, wherein said at least polysiloxane vinylic crosslinker comprises at least 30% by mole of siloxane units each having at least one phenyl substituent.

14. The embedded silicone hydrogel contact lens of claim 12, wherein said at least polysiloxane vinylic crosslinker comprises: (i) three or more vinylphenylsiloxane units each having at least one phenyl substituent and one vinyl substituent; (ii) three or more phenylmethylsiloxane units; (iii) three or more diphenylsiloxane units; or (iv) combinations thereof.

15. The embedded silicone hydrogel contact lens of claim 12, wherein said at least polysiloxane vinylic crosslinker comprises one or more vinyl terminated polyphenylmethysiloxanes, one or more vinylphenylmethyl terminated phenylmethyl-vinylphenylsiloxane copolymers, one or more vinyl terminated diphenylsiloxane-dimethylsiloxane copolymers, or combinations thereof.

16. The embedded silicone hydrogel contact lens of claim 12, wherein the crosslinked polymeric material comprises repeating units of at least one aryl acrylic monomer of formula (I) or (II)

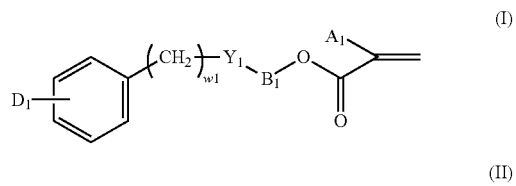

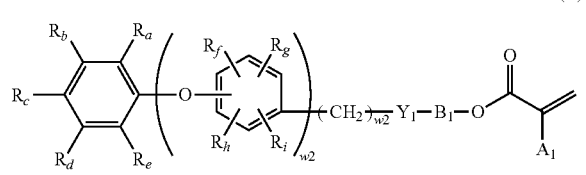

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_{n'}H_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

17. The embedded silicone hydrogel contact lens of claim 12, wherein the hydrophobic insert is rigid.

18. The embedded silicone hydrogel contact lens of claim 5, wherein the silicone hydrogel material comprises repeating units of at least one silicone-containing vinylic monomer of formula (M1) or (M2)

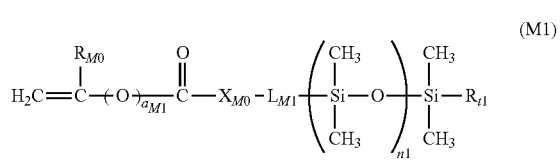

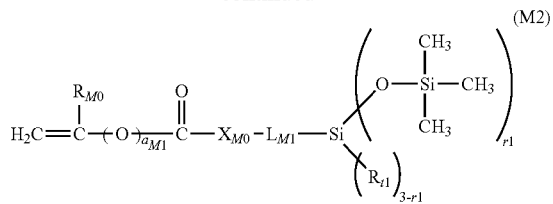

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

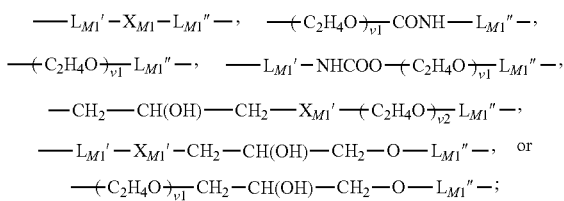

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; m2 is an integer of 0 to 30; n1 is an integer of 3 to 40; and r1 is an integer of 2 or 3.

19. The embedded silicone hydrogel contact lens of claim 18, wherein the silicone hydrogel material comprises repeating units of at least one second polysiloxane vinylic crosslinker which comprises: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

20. The embedded silicone hydrogel contact lens of claim 19, wherein the silicone hydrogel material comprises: (i) repeating units of at least one non-silicone vinylic crosslinking agent; (ii) repeating units of at least one blending vinylic monomer; (iii) repeating units of at least one polymerizable material selected from the group consisting of a UV-absorbing vinylic monomer, a UV/HEVL-absorbing vinylic monomer, a photochromic vinylic monomer, a polymerizable dye, and combinations thereof; or (iv) combinations thereof.

21. The embedded silicone hydrogel contact lens of claim 20, wherein the silicone hydrogel material has an equilibrium water content (i.e., in fully hydrated state or when being fully hydrated) of from about 20% to about 70% by weight, an oxygen permeability of at least about 40 barrers, and a modulus (i.e., Young's modulus) of about 1.5 MPa or less.

* * * * *